(12) United States Patent
Mustafa (10) Patent No.: US 8,141,127 B1
(45) Date of Patent: Mar. 20, 2012

(54) HIGH GRANULARITY REACTIVE MEASURES FOR SELECTIVE PRUNING OF INFORMATION

(75) Inventor: Tarique Mustafa, San Jose, CA (US)

(73) Assignee: nexTier Networks, Inc., San Jose, CA (US)

( * ) Notice: Subject to any disclaimer, the term of this patent is extended or adjusted under 35 U.S.C. 154(b) by 1005 days.

(21) Appl. No.: 11/977,211

(22) Filed: Oct. 23, 2007

Related U.S. Application Data (60) Provisional application No. 60/853,705, filed on Oct. 24, 2006.

(51) Int. Cl.
*H04L 29/06* (2006.01)
(52) U.S. Cl. .............................. 726/1; 726/22
(58) Field of Classification Search .................. None
See application file for complete search history.

(56) References Cited

U.S. PATENT DOCUMENTS

| | | | |
|---|---|---|---|
| 2003/0046582 A1* | 3/2003 | Black et al. | 713/201 |
| 2003/0163729 A1* | 8/2003 | Buchegger | 713/201 |
| 2004/0255151 A1* | 12/2004 | Mei et al. | 713/201 |
| 2006/0075508 A1* | 4/2006 | Guo et al. | 726/27 |
| 2006/0179040 A1* | 8/2006 | Bird et al. | 707/3 |

\* cited by examiner

*Primary Examiner* — Gilberto Barron, Jr.
*Assistant Examiner* — David Le
(74) *Attorney, Agent, or Firm* — Blakely Sokoloff Taylor & Zafman LLP (57) ABSTRACT

Some embodiments of high granularity reactive measures for selective pruning of information have been presented. The system and apparatus embody algorithms to automatically evaluate the security based significance (also referred to as "information enthalpy") of a given set of structured, semi-structured or unstructured Data. This is also termed as security parameter index (SPI), represented by a numerical value, and is regarded as the intrinsic property of a given set of structured, semi-structured or unstructured Data. In one embodiment, a security parameter index (SPI) of a set of data is determined based on content of the set of data. If the SPI is above a predetermined threshold, then a security quotient ($S_q$) of the set of data is further determined based on the SPI and an action to be performed on the set of data in the current situation. Based on the value of the $S_q$, a data leak prevention policy is automatically defined and enforced on the set of data in the current situation. The system and apparatus also embody a Security Map that enumerates the security based inter-relationship between Agents, Data Set(s) and permissible Action(s) that can be invoked on the data. The Security Map enables automatic and dynamic generation and enforcement of security policies to prevent data leak.

8 Claims, 5 Drawing Sheets

Security Clearance Map:

- Specifies the Security Clearance Level for all permitted UserActions between Action Invoking Agent and the Action Receiving Agents
- Specifies who can send/receive IEs of what SPI value to/from whom
- Let,
  - Action Invoking Agent := $Src_i$
  - Action Receiving Agent := $Des_j$ Where, $\varepsilon_{ij}$ represents the pre-defined value of Security Quotient Threshold for Action(s) invoked on Data Set(s) by Agents

HIGH GRANULARITY REACTIVE MEASURES FOR SELECTIVE PRUNING OF INFORMATION

RELATED APPLICATION

This application claims the benefit of U.S. Provisional Application No. 60/853,705, filed Oct. 24, 2006, which is incorporated herein by reference.

TECHNICAL FIELD

Embodiments of the present invention relate to data security, and more specifically to data extrusion prevention, also known as Data Leak Prevention (DLP).

BACKGROUND

Data security has been an important issue for many entities (e.g., government, businesses, schools, etc.) for many years. In particular, data extrusion or data leak, which broadly refers to inadvertent and/or malicious disclosure of data, has received much attention because of its potentially severe consequence. For example, malicious disclosure of a company's trade secret to a competitor could result in a severe loss of competitive advantage. Furthermore, an entity may incur significant liability because of malicious disclosure of sensitive data (e.g., social security numbers, medical records, etc.) of others, such as clients, employees, etc. Many law and regulations also mandate substantially complete control of certain data in many entities, such as Sarbanes-Oxley Act, Health Insurance Portability and Accountability Act (HIPAA), Gramm-Leach-Bliley Act, Rule 17a-4 promulgated by United States Securities and Exchange Commission (SEC), etc.

Many protocols and procedures have been developed over the years to prevent data leak or data extrusion. These protocols and procedures may also be referred to as data leak prevention policies or data extrusion prevention policies. Conventionally, some entities hire security staff to manually review communications sent out of the entities' networks (e.g., local area network (LAN)). For example, a security staff member of a company may manually review every electronic mail sent to a recipient outside of the company or between different groups, departments and individuals within a company. However, this approach suffers from many disadvantages, including low speed and potential compromise of privacy and/or confidentiality of sensitive data of others. For example, an electronic mail from an employee of a company to his spouse may disclose an ailment suffered by the employee. The security staff member reviewing this electronic mail would learn about the medical condition of the employee in the course of reviewing electronic mails sent out of the company. As a result, the company may incur liability for the invasion of the employee's privacy.

Some conventional data extrusion prevention policies attempt to automate the review process in order to speed up the process as well as to avoid disclosure of personal information to a security staff member. However, it has been difficult to automate the review process because of various reasons. For example, certain prior at systems make use of Regular Expressions based automatic matching of data format, such as Social Security Number or Credit Card Information, etc., to discover sensitive information embedded in a set of content being communicated to unauthorized recipients or agents. While this technique is simple to employ, it is also severely limited to discovery of data that is intrinsically well structured in nature and hence can be represented as a set of Regular Expressions. This prior art technique is widely used by the Payment Card Industry (PCI). More complex data such as semi-structured and unstructured data is extremely difficult, if not impossible, to be captured in Regular Expressions.

Another certain prior art makes use of lexical matching techniques wherein a pre-specified set of keywords are used to search and discover the existence of sensitive and confidential information embedded in the content of unauthorized communication and/or disclosures between agents. This prior art technique also has major limitations as many such keywords used in this technique may or may not be of any significance when discovered in a set of content under certain circumstances. For example, this technique lacks the ability to discern between a benign use of a certain keyword under certain circumstances versus situations where an actual event of sensitive data leak may be taking place. This prior art is hence also prone to generating high number of False Positives and False Negatives.

One prior art technique to automatically review data uses document fingerprinting, which is ineffective in terms of differentiation of personal matter versus controlled subject matter. Furthermore, a security staff member is still needed to manually intervene the process by manually setting various policies (e.g., access control policies) and creating instruction documents (e.g., memorandum, files, etc.).

Regardless of what technique is being used to discover and identify sensitive information, the existing data leak prevention (DLP) technologies and solutions require extensive manual effort in pre-specifying security policies for each data and file (documents, memos, emails, spreadsheets, or any other structured, semi-structured or unstructured data).

This need for pre-specification of security policies is another major limitation of the prior art techniques and algorithms for Data Leak Prevention (DLP).

There has, therefore, been a long felt need to provide techniques to perform better and deeper contextual and conceptual analyses of the content of structured, semi-structured and unstructured data in a manner that allows for automatic creation of appropriate security policies and automatic application of those security policies in real-time with minimal possible False Positives and False Negatives.

BRIEF DESCRIPTION OF THE DRAWINGS

The present invention is illustrated by way of example, and not by way of limitation, in the figures of the accompanying drawings and in which.

DETAILED DESCRIPTION

Described herein are some embodiments of high granularity reactive measures for selective pruning of information. In some embodiments, a security parameter index (SPI) of a set of data is determined based on content of the set of data. If the SPI is above a predetermined threshold, then a security quotient ($S_q$) of the set of data is further determined based on the SPI and an action to be performed on the set of data in the current situation. Based on the value of the Sq, a data leak prevention policy is automatically defined and enforced on the set of data in the current situation. Data as used herein broadly refers to any electronic information within an entity, such as all or part of an electronic mail or an attachment thereof, all or part of a file (e.g., a document, a spreadsheet, a graph, etc.), all or part of an audio recording and/or a video recording, etc. The action to be performed on the data may or may not alter the data. Some examples of the action include sending the data to another (e.g., via electronic mail, via File Transfer Protocol (FTP), via Telecommunication Network (TELNET), uploading to a website, etc.), copying the data from one drive to another drive, copying the data to a portable device (e.g., a laptop computer, a personal digital assistant (PDA), a universal serial bus (USB) storage device, etc.), printing the data, modifying the data, deleting the data, etc.

In the following description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions below are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general-purpose computer selectively activated or reconfigured by a computer program stored in the computer. Such a computer program may be stored in a machine-readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 1:
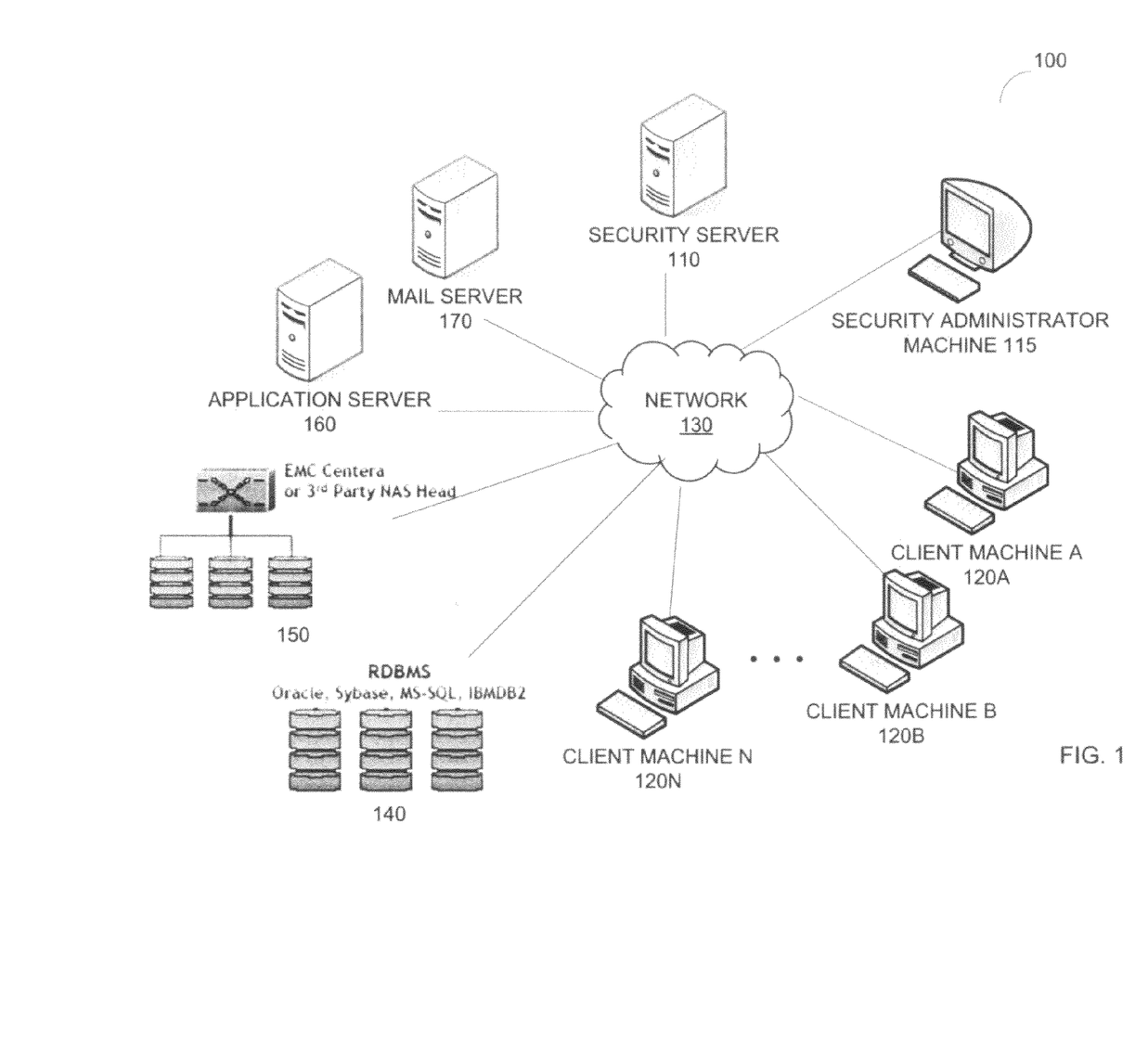
FIG. 1 illustrates one embodiment of a system in which embodiments of the present invention may be implemented.

FIG. 1 illustrates one embodiment of a system in which embodiments of the present invention may be implemented. The system 100 includes a security server 110, a security administrator machine 115, a number of client machines 120A, 120B, 120N, a network 130, a relational database management system (RDBMS) 140, a data storage system 150, an application server 160, and a mail server 170. The devices within the system 100 are communicatively coupled to the network 130, which is typically a network used by an entity (e.g., a company, a government, etc.). Furthermore, the network 130 may include different types of network, such as local area network (LAN), personal area network (PAN), wide area network (WAN), virtual private network (VPN), wireless network, wirelined network, etc.

Figure 2:
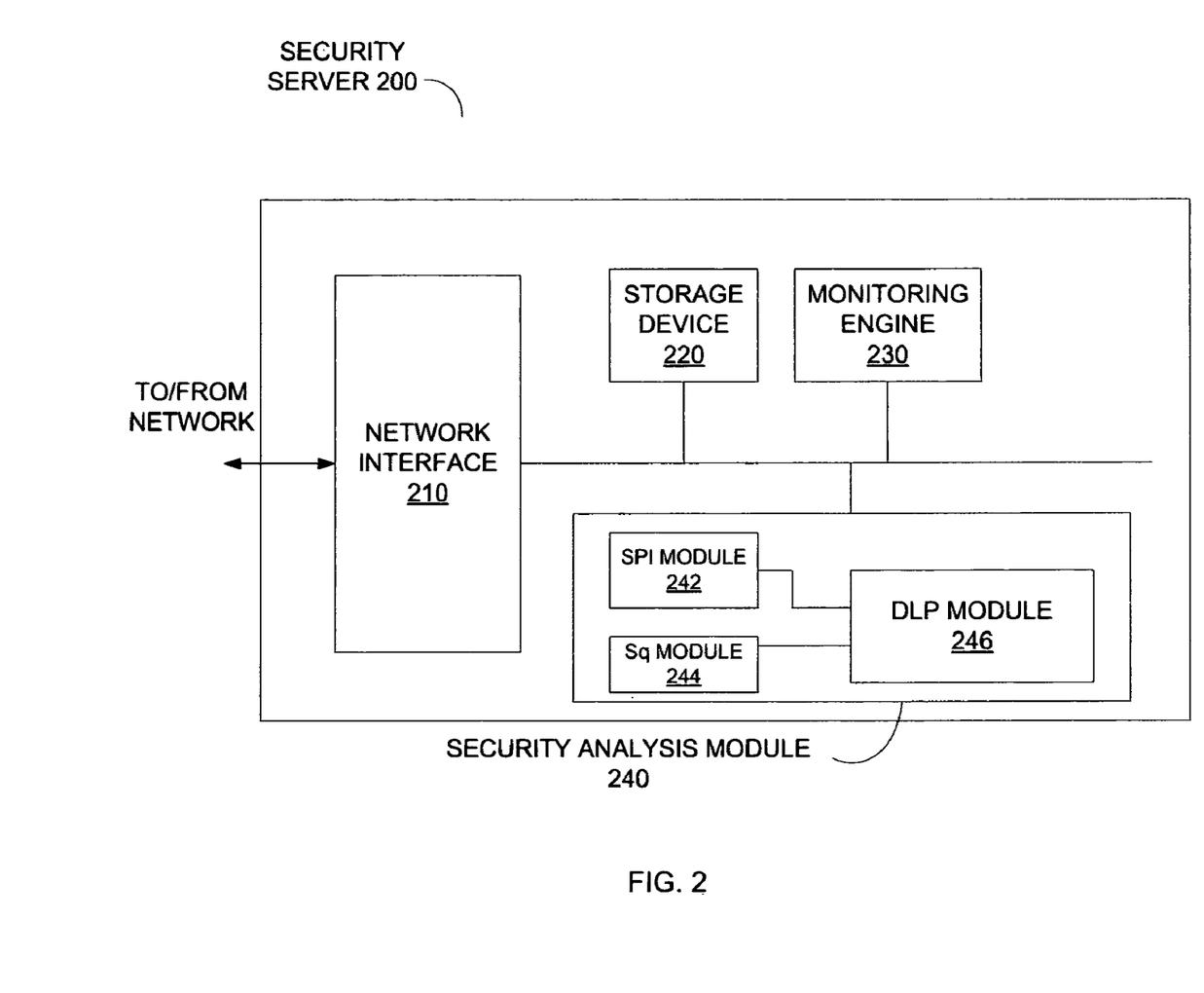
FIG. 2 illustrates a functional block diagram of one embodiment of a security server.

To protect against data leak or data extrusion, the security server 110 and the security administrator machine 115 are coupled to the network 130 for dynamic definition and enforcement of data leak prevention policies. The security server 110 may be implemented using a computer system such as the one shown in FIG. 5. A functional block diagram of one embodiment of the security server 110 is shown in FIG. 2. The security server 110 is a server used to protect data security of the system 100. More details of the security server 110 are discussed below. The security administrator machine 115 is a machine (e.g., a workstation) usable by a human user (e.g., security administrator) to interact with the security server 110. For instance, the security administrator machine 115 may present a user interface (e.g., a graphical user interface, a command line interface, etc.) to receive inputs from the security administrator and/or to present messages to the security administrator.

In some embodiments, the client machines 120A-120N may include different types of devices, such as desktop personal computers (PCs), laptop PCs, personal digital assistants (PDAs), smart phones, special purpose devices (e.g., ordering devices in a point of sale system, etc.), etc. Some examples of the RDBMS 140 include Oracle®, Sybase®, Microsoft® SQL (MS-SQL), IBM® DB2, etc. The data storage system 150 is a subsystem for storing data. One example of the data storage system 150 adopts a network attached storage (NAS) configuration, which may further include a file server implemented in the form of an appliance, called a filer, attached to the network 130. The application server 160 may be a server dedicated to executing one or more applications, where an application broadly refers to a program or a suite of programs executable by one or more processors to perform tasks and/or functions. The mail server 170 is a server generally used for receiving, sending, and/or routing electronic communications (e.g., electronic mail) between different machines, which may include machines external to the system 100.

Note that any or all of the components and the associated hardware illustrated in FIG. 1 may be used in various embodiments of the system 100. However, it should be appreciated that other configurations of the system 100 may include more or fewer devices than those shown in FIG. 1. For example, there may be additional servers and/or client machines coupled to the network 130 than those shown in FIG. 1.

In some embodiments, the security server 110 monitors data within the system 100 as well as attempted actions on the data. The data within the system 100 may include a wide variety of information, ranging from highly sensitive information (e.g., medical records of patients, social security numbers of employees, etc.) to publicly available information (e.g., published financial records filed with Security Exchange Committee (SEC), annual reports of public companies, etc.). As such, different data leak prevention policies may be applicable in different situations. Thus, to appropriately protect data security, the security server 110 may compute a security parameter index (SPI) for a set of data based on the content of the data.

In some embodiments, the Security Parameter Index (SPI) can be as simple as empirically determined numerical value. For example, the SPI may be a numerical value within a predetermined range (e.g., 0 to 1, 0 to 100, etc.), where the higher the SPI, the more sensitive the data is. In some embodiments, the Security Parameter Index (SPI) could be a more complex derived formula that computes numerical value.

Based on the SPI of the data, the security server 110 determines whether to further evaluate an attempted action on the data. For example, a SPI threshold may have been previously defined such that an attempted action on data having a SPI below the SPI threshold would not trigger further evaluation of the data and the attempted action, and vice versa. If the SPI of the data is above the SPI threshold, the security server 110 may further evaluate the attempted action on the data in a current situation in order to dynamically define an applicable data leak prevention policy for the current situation. In some embodiments, the security server 110 computes a security quotient ($S_q$) based on a variety of factors, which may include the SPI, one or more Agents who have invoked the action (also referred to as the source or Src.), and one or more Agents who are designated recipients of the data as a result of the action (also referred to as the destination or Dest.), if any. In some embodiments, $S_q$ is represented as a function as follows:

$$S_q = f(Src, Dest, SPI),$$

where Src is a value associated with the Agent who invokes the action, Dest. is a value associated with an Agent who is to receive the data, and SPI is the security parameter index of the data.

Based on the $S_q$ of the data with respect to the attempted action in the current situation, the security server 110 may define an appropriate data leak prevention policy to apply to the current situation. For example, the data may include social security numbers of employees, which has a SPI above the predetermined SPI threshold. Thus, the security server 110 further computes a $S_q$. Suppose the attempted action is a payroll department staff sending the data (i.e., the social security numbers of the employees) as an attachment to an email via the mail server 170 to a paycheck processing service provider. Then the source is the payroll department staff and the destination is the paycheck processing service provider. The security server 110 then computes the security quotient, $S_{q1}$ in this example using the SPI of the social security numbers, a source value predefined for the payroll department staff, a destination value predefined for the paycheck processing service provider, and a predefined value for the action "email". In another example, the attempted action may be the payroll department staff sending the data as an attachment to an email via the mail server 170 to an unknown recipient. The security server 110 may compute the security quotient, $S_{q2}$ in this example using the SPI of the social security numbers, a source value predefined for the payroll department staff, and a destination value predefined for unknown recipients external to the system 100. Note that although both situations in the above two examples involve sending the same data, but the designated recipients are different, and thus, the value of $S_{q1}$ is different from $S_{q2}$. For instance, a higher value of $S_q$ may indicate a higher level of risk of leaking data to unauthorized recipients. Thus, $S_{q2}$ may have a value of 92 while $S_{q1}$ has a value of 10 in the above examples. Based on the value of $S_q$, the security server 110 dynamically determines a data leak prevention policy applicable to the current situation and then takes the appropriate action to protect the data according to the data leak prevention policy. More details of some embodiments of how the security server 110 responses based on the value of $S_q$ are discussed below.

FIG. 2 illustrates a functional block diagram of one embodiment of a security server within a system of an entity, such as the security server 110 in FIG. 1. The security server 200 includes a network interface 210, a storage device 220, a monitoring engine 230, and a security analysis module 240, which are operatively coupled to each other. In some embodiments, the security analysis module 240 further includes a SPI module 242, a $S_q$ module 244, and a data leak prevention (DLP) module 246.

In some embodiments, the input interface 210 is communicatively coupled to a network of an entity (e.g., the network 130 in FIG. 1) and the monitoring engine 230 monitors data within the network. When an Action is invoked on a set of data, the SPI module 242 of the security analysis module 240 may compute the SPI of the data based on the content of the data. If the SPI of the data is above a predetermined SPI threshold, then the Sq module 244 may compute the $S_q$ of the data in the current situation by taking into account of the Action invoked, the one or more Agents who have invoked the Action, and one or more designated or intended Agents who are the recipients of the data as a result of the Action. Some examples of the Action include sending the data out of a private network of the entity, modifying the data, deleting the data, and copying the data to a portable machine-readable medium, moving the data to a networked storage having a different security classification (e.g., copying data from a secured drive to a public drive), etc. Based on the $S_q$ computed, the DLP module 246 dynamically determines the appropriate data leak prevention policy applicable to the current situation.

In some embodiments, three levels of $S_q$ are predefined, namely, warning level, alert level, and alarm level. If the $S_q$ computed in the current situation is below the warning level, then the monitoring engine 230 simply allows the Action to complete. If the $S_q$ computed is above or equal to the warning level and below the alert level, then the DLP module 246 determines that the warning level policy is appropriate in the current situation. Accordingly, the monitoring engine 230 still allows the Action to complete, but also generates a warning message on a monitoring dashboard, which is a user interface presented on a machine used by a security administrator (e.g., the security administrator machine 115 in FIG. 1). Furthermore, if the number of warnings within a predetermined period is above a predefined threshold, the monitoring engine 230 may send an alarm to the security administrator.

If the $S_q$ computed is above or equal to the alert level and below the alarm level, then the DLP module 246 determines that the alert level policy is appropriate in the current situation. Accordingly, the monitoring engine 230 generates an alert message on the monitoring dashboard and issues a user notification message to the Agent who has invoked the action. For instance, the user notification message may be sent to a client machine (e.g., the client machine 120A in FIG. 1) via which the Agent has invoked the action. If the Agent confirms or approves the Action in response to the user notification message, then the monitoring engine 230 allows the Action to complete and sends a notification authorization message to the security administrator. Otherwise, if the Agent disapproves or cancels the Action, the Action is blocked.

If the $S_q$ computed is above or equal to the alarm level, then the DLP module 246 determines that the alarm level policy is appropriate in the current situation. Accordingly, the monitoring engine 230 generates an alarm message on the monitoring dashboard and issues a user notification message to the Agent who has invoked the Action. Furthermore, the monitoring engine 230 issues an administrator notification message to the security administrator. If the Agent disapproves or cancels the Action, the Action is blocked. Otherwise, if the Agent confirms or approves the Action in response to the user notification message, then the monitoring engine 230 sends a notification authorization message to the security administrator. If the security administrator approves the Action in response to the notification authorization message, then the monitoring engine 230 allows the Action to complete and sends an Action completed message to the Agent. Otherwise, if the security administrator disapproves the Action, then the monitoring engine 230 blocks the Action and sends an Action blocked message to the Agent.

In some embodiments, the storage device 220 stores a Security Clearance map, which specifies the security clearance level for all permitted Actions between an action invoking Agent and an Agent that is the designated data recipient. The security clearance map may specify who in an entity may send what data to whom. For instance, the security clearance map may specify employees on a director level may send data having a SPI above a predetermined value to each other. Using the security clearance map, the security analysis module 240 and the monitoring engine 230 may dynamically determine which data leak prevention policy is applicable in a situation and enforce the data leak prevention policy.

Figure 3:
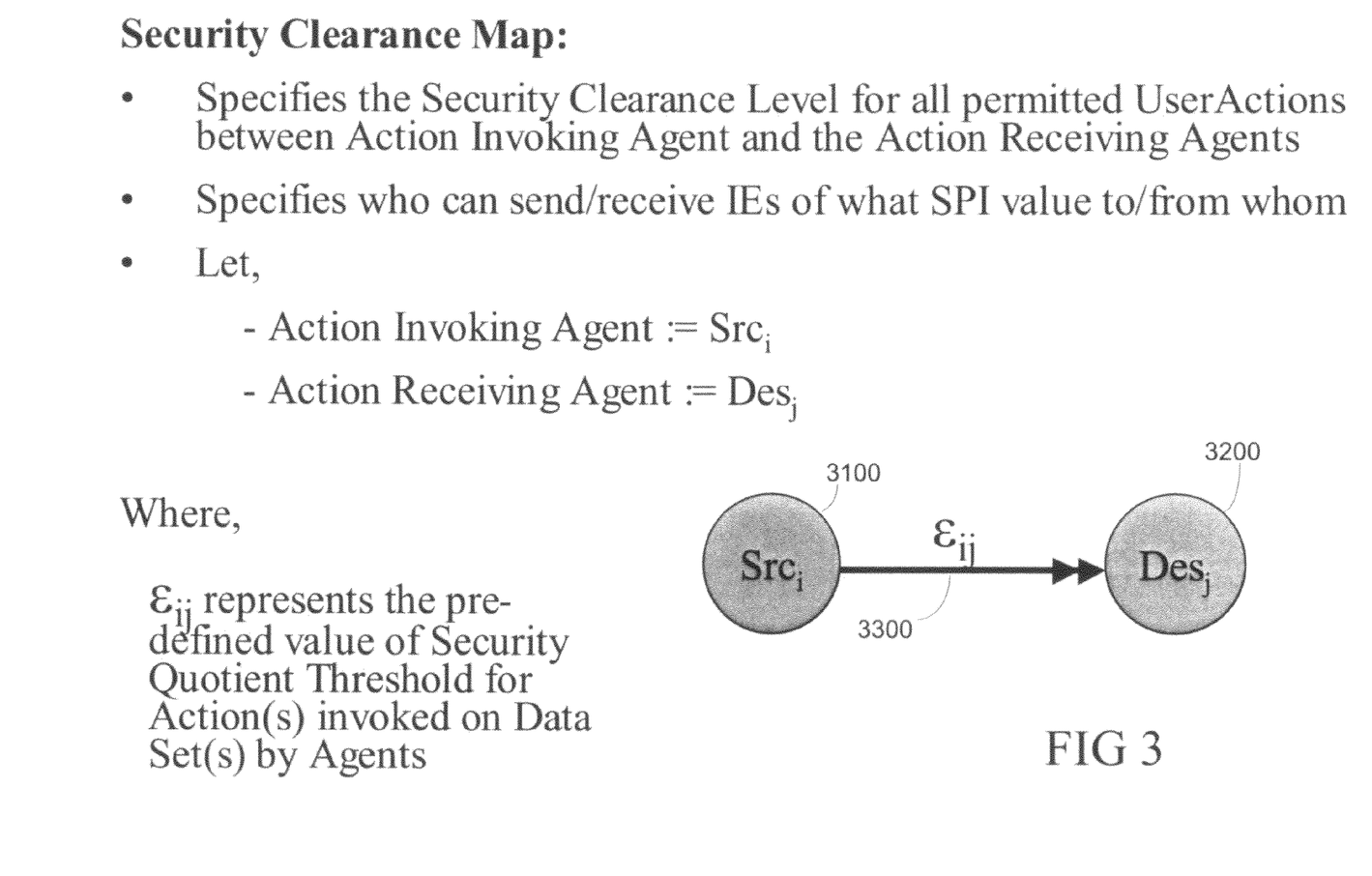
FIG. 3 illustrates a conceptual diagram of one embodiment of a security clearance map to automate real-time security policy generation.

FIG. 3 illustrates the structure of one embodiment of the Security Clearance Map. One embodiment of the Security Clearance Map is comprised of three main concepts namely, Agents, Actions and Data Sets. Agents represent a set of entities such as users, machines, processes, algorithms, etc., that perform and/or seek to perform one or more Actions on a set of Data, or are the end destination of a set of Data that has been transported, manipulated and/or transformed by another Agent. For example, a user starting an FTP download of a set of Data may be the Agent invoking the Data transport process. Similarly, a client software requesting a print operation on a set of Data may be the source Agent invoking the print operation while the target printer actually printing the Data set may be the destination Agent. Actions represent a set of operations that can be performed on Data Sets to transport, convert, manipulate, modify or transform the Data. The Data Sets may be structured, semi-structured or unstructured data of any type and/or modality.

In one preferred embodiment of Security Clearance Map depicted in FIG. 3, the Agents may be represented by nodes (such as nodes 3100 and 3200) and the Actions may be represented as directed arcs (such as directed arc 3300) connecting the nodes. Each arc in such an embodiment representing an Action may have two attributes—Data Set(s) and a corresponding Threshold Value $\epsilon_{ij}$ for Security Quotient '$S_q$'.

The Security Clearance Map is generated dynamically and represents crucial information needed to automatically generate and enforce security policies for Data Leak Prevention.

Figure 4:
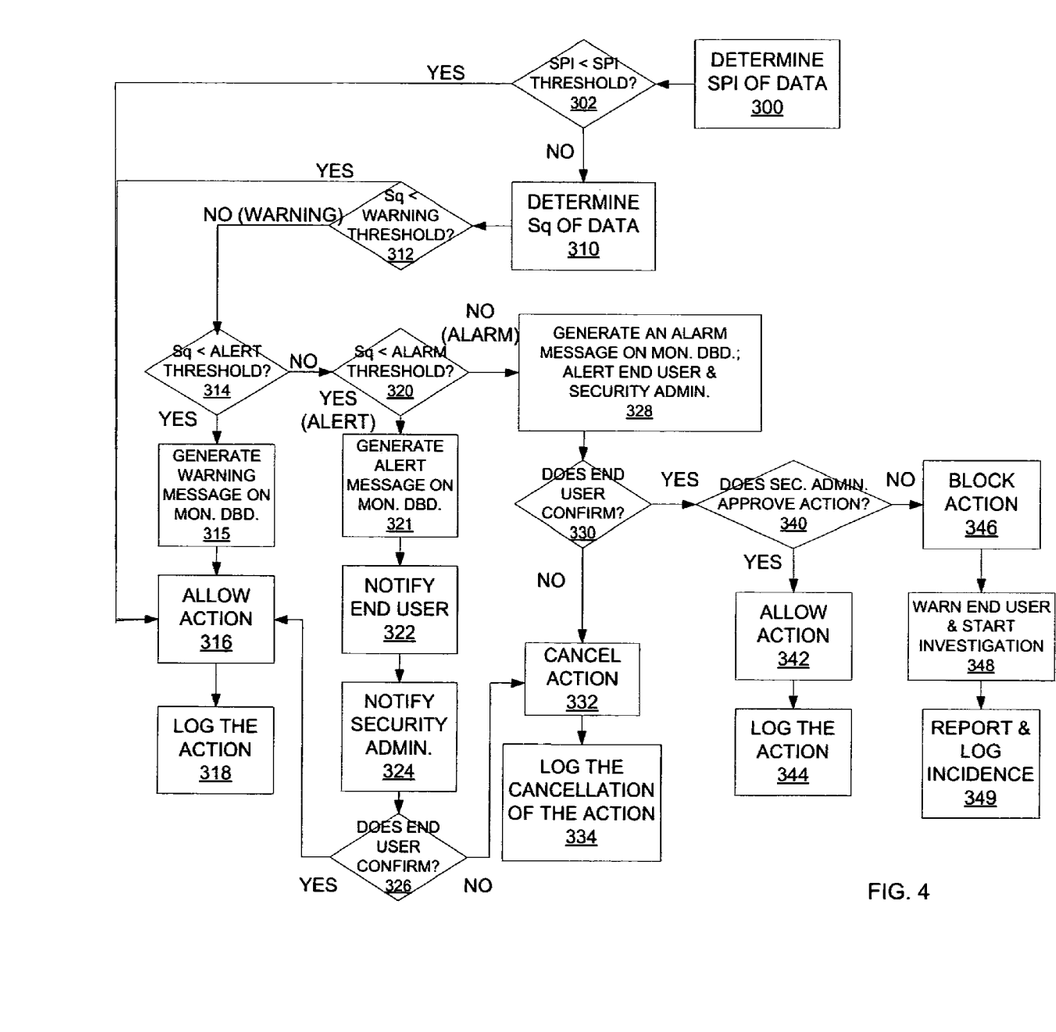
FIG. 4 illustrates a flow diagram of one embodiment of a process to prevent data extrusion.

FIG. 4 illustrates a flow diagram of one embodiment of a process to prevent data extrusion from a network of an entity. The process may be performed by processing logic that may comprise hardware (e.g., circuitry, dedicated logic, programmable logic, microcode, etc.), software (such as instructions run on a processing device), firmware, or a combination thereof. For example, the security server 110 in FIG. 1 may perform at least part of the process.

In response to an invocation of an action on some data within the network of the entity, processing logic determines the SPI of the data (processing block 300). Then processing logic checks to determine if the SPI of the data is less than a predetermined SPI threshold (processing block 302). If the SPI of the data is less than the SPI threshold, then the data is of low sensitivity, and thus, processing logic allows the action to complete without further evaluation of the action (processing block 316). Nevertheless, processing logic may log the action (processing block 318).

If the SPI of the data is greater than or equal to the predetermined SPI threshold, then processing logic further determines a $S_q$ of the data in the current situation (processing block 310). In some embodiments, processing logic computes $S_q$ of the data based on various factors, such as the SPI of the data, an end user who has invoked the action, a recipient of the data as a result of the action, and/or the type of the action, etc. Based on the value of the $S_q$, processing logic defines a data leak prevention policy appropriate in the current situation and enforces the data leak prevention policy. Some embodiments of the definition and enforcement of data leak prevention policy are discussed below in details.

Referring back to FIG. 4, processing logic checks to determine if the $S_q$ is less than a predetermined warning threshold (processing block 312). If the $S_q$ is less than the warning threshold, then processing logic allows the action to complete (processing block 316) and then logs the action (processing block 318). Otherwise, if the $S_q$ is not less than the warning threshold, then processing logic checks to determine if the $S_q$ is less than the alert threshold (processing block 314). If the $S_q$ is less than the alert threshold, then the situation is on the warning level, and thus, processing logic generates a warning message on a monitoring dashboard (processing block 315). The monitoring dashboard may include a user interface (e.g., a graphical user interface, a command line interface, etc.) usable by a security administrator of the entity to interact with the security server. Then processing logic allows the action to complete (processing block 316) and then logs the action (processing block 318).

If the $S_q$ is greater than or equal to the alert threshold, then processing logic checks to determine if the $S_q$ is less than the alarm threshold (processing block 320). If the $S_q$ is less than the alarm threshold, then the situation is on the alert level, and thus, processing logic generates an alert message on the monitoring dashboard (processing block 321). Then processing logic notifies the Agent(s) who invoked the Action(s) (processing block 322) as well as the security administrator (processing block 324). Then processing logic determines if the Agent confirms or approves the Action in response to the notification sent to the Agent (processing block 326). If the end Agent confirms the Action, then processing logic allows the Action to complete (processing block 316) and logs the action (processing block 318). Otherwise, if the Agent does not confirm the Action, then processing logic cancels the Action (processing block 332) and logs the cancellation of the Action (processing block 334).

If the $S_q$ is greater than or equal to the alarm threshold, then the situation is on the alarm level, and thus, processing logic generates an alarm message on the monitoring dashboard, and notifies both the Agent and the security administrator (processing block 328). Then processing logic determines if the Agent confirms or approves the action in response to the notification to the Agent (processing block 330). If the Agent does not confirm the Action, the processing logic cancels the action (processing block 332) and logs the cancellation of the action (processing block 334). Otherwise, if the Agent confirms the Action, then processing logic checks to determine if the security administrator approves the Action (processing block 340). If the security administrator approves the Action, then processing logic allows the action to complete (processing block 342) and logs the Action (processing block 344). Otherwise, if the security administrator disapproves the Action, then processing logic blocks the Action (processing block 346). Processing logic may further warn the Agent and start investigation of the attempted breach of data security (processing block 348). Furthermore, processing logic may report and log the incidence (processing block 349).

Note that in other embodiments, processing logic may perform the operations described above in a different sequence. Furthermore, processing logic may perform more or fewer operations than those illustrated in FIG. 4 in some embodiments.

Figure 5:
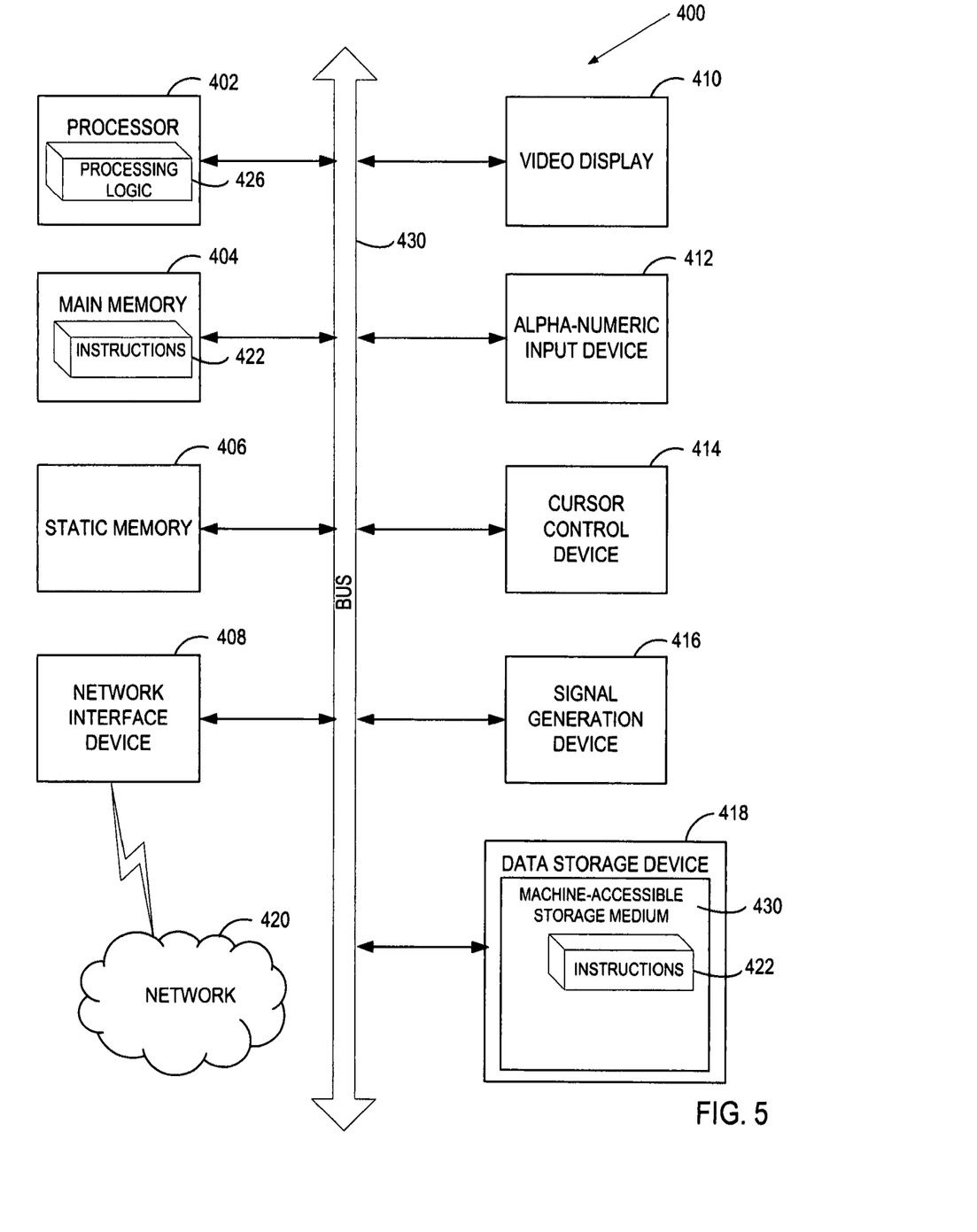
FIG. 5 illustrates a block diagram of an exemplary computer system.

FIG. 5 illustrates a diagrammatic representation of a machine in the exemplary form of a computer system 400 within which a set of instructions, for causing the machine to perform any one or more of the methodologies discussed herein, may be executed. In alternative embodiments, the machine may be connected (e.g., networked) to other machines in a LAN, an intranet, an extranet, and/or the Internet. The machine may operate in the capacity of a server or a client machine in client-server network environment, or as a peer machine in a peer-to-peer (or distributed) network environment. The machine may be a PC, a tablet PC, a set-top box (STB), a PDA, a cellular telephone, a web appliance, a server, a network router, a switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 430.

Processing device 402 represents one or more general-purpose processing devices such as a microprocessor, a central processing unit, or the like. More particularly, the processing device may be complex instruction set computing (CISC) microprocessor, reduced instruction set computing (RISC) microprocessor, very long instruction word (VLIW) microprocessor, or processor implementing other instruction sets, or processors implementing a combination of instruction sets. Processing device 402 may also be one or more special-purpose processing devices such as an application specific integrated circuit (ASIC), a field programmable gate array (FPGA), a digital signal processor (DSP), network processor, or the like. The processing device 402 is configured to execute the processing logic 426 for performing the operations and steps discussed herein.

The computer system 400 may further include a network interface device 408. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 416 (e.g., a speaker).

The data storage device 418 may include a machine-accessible storage medium 430 (also known as a machine-readable storage medium) on which is stored one or more sets of instructions (e.g., software 422) embodying any one or more of the methodologies or functions described herein. The software 422 may also reside, completely or at least partially, within the main memory 404 and/or within the processing device 402 during execution thereof by the computer system 400, the main memory 404 and the processing device 402 also constituting machine-accessible storage media. The software 422 may further be transmitted or received over a network 420 via the network interface device 408.

While the machine-accessible storage medium 430 is shown in an exemplary embodiment to be a single medium, the term "machine-accessible storage medium" should be taken to include a single medium or multiple media (e.g., a centralized or distributed database, and/or associated caches and servers) that store the one or more sets of instructions. The term "machine-accessible storage medium" shall also be taken to include any medium that is capable of storing, encoding or carrying a set of instructions for execution by the machine and that cause the machine to perform any one or more of the methodologies of the present invention. The term "machine-accessible storage medium" shall accordingly be taken to include, but not be limited to, solid-state memories, optical and magnetic media, etc.

Thus, some embodiments of high granularity reactive measures for selective pruning of information have been described. It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A computer-implemented method for preventing data from being leaked to outside of a network domain, the method comprising:
  determining a security parameter index (SPI) of a set of data based on content of the set of data;
  if the SPI is above a confidentiality threshold, determining a security quotient ($S_q$) of the set of data based on the SPI and an action to be performed on the set of data in a current situation, said determining comprising
    identifying one or more Source Agents, who invoke the action, and one or more Destination Agents, who are designated to receive the set of data as a result of the action, and
    computing the $S_q$ of the set of data in the current situation based on the SPI, the one or more Source Agents, and the one or more Destination Agents; and
  based on a value of the $S_q$, automatically defining a data leak prevention policy and enforcing said data leak prevention policy on the set of data in the current situation to prevent the set of data from being leaked from the one or more Source Agents that are located within a private network to the one or more Destination Agents that are located outside of the private network,
wherein automatically defining and enforcing said data leak prevention policy on the set of data comprises
looking up within a security clearance map to determine a predetermined security clearance associated with the one or more Source Agents, the security clearance map including a plurality entries, each specifying a security clearance level required for performing a particular action between a particular source agent and a particular destination agent,
comparing the $S_q$ with the predetermined security clearance to determine whether the one or more Source Agents are entitled to perform the action on the set of data that is to be received by the one or more Destination Agents,
if the $S_q$ is greater than or equal to a warning threshold but less than an alert threshold, generating a warning message on a monitoring dashboard of a monitoring device and allowing the action to be performed on the set of data,
if the $S_q$ is greater than or equal to the alert threshold but less than an alarm threshold, generating an alert message on the monitoring dashboard of the monitoring device and transmitting a user alert notification message to the one or more Source Agents, and
if the $S_q$ is greater than or equal to the alarm threshold, generating an alarm message on the monitoring dashboard of the monitoring device, transmitting a user alarm notification message to the one or more Source Agents, and transmitting an administrator alarm notification message to a security administrator of the private network,
determining a number of warning messages that have been issued within a predetermined period of time, and
transmitting a second alarm message to the security administrator of the private network, if the number of warning messages issued within the predetermined period of time exceeds a predetermined threshold,
sending a notification authorization message to the security administrator if the one or more Source Agents confirm the action in response to the user alarm notification message,
allowing the action to proceed and sending an action completed message to the one or more Source Agents, if the security administrator approves the action in response to the notification authorization message,
blocking the action and sending an action blocked message to the one or more Source Agents, if the security administrator disapproves the action in response to the notification authorization message,
blocking the action if the one or more Source Agents fail to confirm the action in response to the user alert notification message, and
if the one or more Source Agents confirm the action in response to the user alert notification message, allowing the action to proceed and sending a notification authorization message to the security administrator.

2. The method of claim 1, further comprising:
monitoring the private network of an entity for invocation of actions on data within the entity.

3. The method of claim 1, further comprising:
reacting to the action based on said data leak prevention policy, wherein said reacting comprises one or more of allowing the action to proceed, blocking the action, reporting the action, logging the action, and generating a warning on the action.

4. A non-transitory machine accessible storage medium that provides instructions that, when executed by a processor, will cause the processor to perform operations comprising:
determining a security parameter index (SPI) of a set of data based on content of the set of data;
if the SPI is above a confidentiality threshold, determining a security quotient ($S_q$) of the set of data based on the SPI and an action to be performed on the set of data in a current situation, said determining comprising
identifying one or more Source Agents, who invoke the action, and one or more Destination Agents, who are designated to receive the set of data as a result of the action, and
computing the $S_q$ of the set of data in the current situation based on the SPI, the one or more Source Agents, and the one or more Destination Agents; and
based on a value of the $S_q$, automatically defining a data leak prevention policy and enforcing said data leak prevention policy on the set of data in the current situation to prevent the set of data from being leaked from the one or more source Agents that are located within a private network to the one or more Destination Agents that are located outside of the private network,
wherein automatically defining and enforcing said data leak prevention policy on the set of data comprises
looking up within a security clearance map to determine a predetermined security clearance associated with the one or more Source Agents, the security clearance map including a plurality entries, each specifying a security clearance level required for performing a particular action between a particular source agent and a particular destination agent,
comparing the $S_q$ with the predetermined security clearance to determine whether the one or more Source Agents are entitled to perform the action on the set of data that is to be received by the one or more Destination Agents,
if the $S_q$ is greater than or equal to a warning threshold but less than an alert threshold, generating a warning message on a monitoring dashboard of a monitoring device and allowing the action to be performed on the set of data,
if the $S_q$ is greater than or equal to the alert threshold but less than an alarm threshold, generating an alert message on the monitoring dashboard of the monitoring device and transmitting a user alert notification message to the one or more Source Agents, and
if the $S_q$ is greater than or equal to the alarm threshold, generating an alarm message on the monitoring dashboard of the monitoring device, transmitting a user alarm notification message to the one or more Source Agents, and transmitting an administrator alarm notification message to a security administrator of the private network,
determining a number of warning messages that have been issued within a predetermined period of time,
transmitting a second alarm message to the security administrator of the private network, if the number of warning messages issued within the predetermined period of time exceeds a predetermined threshold,
sending a notification authorization message to the security administrator if the one or more Source Agents confirm the action in response to the user alarm notification message, allowing the action to proceed and sending an action completed message to the one or more Source Agents, if the security administrator approves the action in response to the notification authorization message, blocking the action and sending an action blocked message to the one or more Source Agents, if the security administrator disapproves the action in response to the notification authorization message, blocking the action if the one or more Source Agents fail to confirm the action in response to the user alert notification message, and if the one or more Source Agents confirm the action in response to the user alert notification message, allowing the action to proceed and sending a notification authorization message to the security administrator.

5. The non-transitory machine accessible storage medium of claim 4, the operations further comprise:

reacting to the action based on said data leak prevention policy, wherein said reacting comprises one or more of allowing the action to proceed, blocking the action, reporting the action, logging the action, and generating a warning on the action.

6. An apparatus comprising:

a processor to execute a security parameter index (SPI) module to determine a SPI of a set of data based on content of the set of data;

a security quotient ($S_q$) module to determine a $S_q$ of the set of data based on the SPI and an action to be performed on the set of data in a current situation if the SPI is above a confidentiality threshold, wherein the processor executes the $S_q$ module to identify one or more Source Agents, who invoke the action, and one or more Destination Agents, who are designated to receive the set of data as a result of the action, wherein the $S_q$ module comprises a computation module to compute the $S_q$ of the set of data in the current situation based on the SPI, the one or more Source Agents, and the one or more Destination Agents;

a data leak prevention module to automatically define a data leak prevention policy; and a monitoring engine to enforce said data leak prevention policy on the set of data in the current situation to prevent the set of data from being leaked from the one or more Source Agents that are located within a private network to the one or more Destination Agents that are located outside of the private network, including looking up within a security clearance map to determine a predetermined security clearance associated with the one or more Source Agents, the security clearance map including a plurality entries, each specifying a security clearance level required for performing a particular action between a particular source agent and a particular destination agent, comparing the $S_q$ with the predetermined security clearance to determine whether the one or more Source Agents are entitled to perform the action on the set of data that is to be received by the one or more Destination Agents, if the $S_q$ is greater than or equal to a warning threshold but less than an alert threshold, generating a warning message on a monitoring dashboard of a monitoring device and allowing the action to be performed on the set of data, if the $S_q$ is greater than or equal to the alert threshold but less than an alarm threshold, generating an alert message on the monitoring dashboard of the monitoring device and transmitting a user alert notification message to the one or more Source Agents, if the $S_q$ is greater than or equal to the alarm threshold, generating an alarm message on the monitoring dashboard of the monitoring device, transmitting a user alarm notification message to the one or more Source Agents, and transmitting an administrator alarm notification message to a security administrator of the private network, determining a number of warning messages that have been issued within a predetermined period of time, and transmitting a second alarm message to the security administrator of the private network, if the number of warning messages issued within the predetermined period of time exceeds a predetermined threshold, sending a notification authorization message to the security administrator if the one or more Source Agents confirm the action in response to the user alarm notification message, allowing the action to proceed and sending an action completed message to the one or more Source Agents, if the security administrator approves the action in response to the notification authorization message, blocking the action and sending an action blocked message to the one or more Source Agents, if the security administrator disapproves the action in response to the notification authorization message, blocking the action if the one or more Source Agents fail to confirm the action in response to the user alert notification message, and if the one or more Source Agents confirm the action in response to the user alert notification message, allowing the action to proceed and sending a notification authorization message to the security administrator.

7. The apparatus of claim 6, wherein the action comprises at least one of sending the set of data via electronic mail, modifying the set of data, deleting the set of data, and copying the set of data to a portable machine-readable medium.

8. A system comprising a security server including the apparatus of claim 6, the system further comprising:

a network communicatively coupled to the security server; and a client machine communicatively coupled to the network, wherein the action has been invoked via the client machine.

\* \* \* \* \*